United States Patent
Emerson et al.

(10) Patent No.: US 7,182,703 B2
(45) Date of Patent: Feb. 27, 2007

(54) LOW COMPRESSION HIGH SPIN GOLF BALL

(75) Inventors: Brent Emerson, Mooresville, NC (US);
Tracie Smith, Westminster, SC (US);
Jeffrey Frederick, Walhalla, SC (US);
Reggie Watson, Seneca, SC (US)

(73) Assignee: TaylorMade-Adidas Golf Company, San Diego, CA (US)

(*) Notice: Subject to any disclaimer, the term of this patent is extended or adjusted under 35 U.S.C. 154(b) by 0 days.

(21) Appl. No.: 10/763,118

(22) Filed: Jan. 22, 2004

(65) Prior Publication Data

US 2005/0037866 A1   Feb. 17, 2005

Related U.S. Application Data

(60) Provisional application No. 60/441,803, filed on Jan. 22, 2003.

(51) Int. Cl.
*A63B 37/12* (2006.01)

(52) U.S. Cl. ....................................................... 473/378

(58) Field of Classification Search ................. 473/378
See application file for complete search history.

(56) References Cited

U.S. PATENT DOCUMENTS

| | | | |
|---|---|---|---|
| 6,325,731 B1* | 12/2001 | Kennedy et al. ............ 473/377 |
| 2001/0031673 A1* | 10/2001 | Watanabe .................... 473/378 |
| 2004/0157681 A1* | 8/2004 | Lemons et al. ............. 473/371 |
| 2005/0009636 A1* | 1/2005 | Kuntimaddi et al. ....... 473/351 |

* cited by examiner

*Primary Examiner*—Raeann Gorden
(74) *Attorney, Agent, or Firm*—Lorusso & Associates

(57) ABSTRACT

A golf ball having a cover comprised of a single ionomeric resin. The resin has an acid content no greater than about 10% and is preferably 100% neutralized and has a flex modulus of at least 31,000 psi. The ball has a Shore D hardness of about 55, a PGA compression of about 85, a COR of at least 0.700 and exhibits superior cut and abrasion resistance while providing a soft feel and a high spin rate.

12 Claims, 2 Drawing Sheets

LOW COMPRESSION HIGH SPIN GOLF BALL

CROSS-REFERENCE TO RELATED APPLICATIONS

A claim of benefit is made to U.S. provisional application Ser. No. 60/441,803, filed Jan. 22, 2003, the contents of which are incorporated herein by reference.

FIELD OF THE INVENTION

The present invention relates to golf balls, and more particularly, to golf balls having a low overall PGA ball compression for greater distance and a tough but soft cover for higher ball spin rate.

BACKGROUND OF THE INVENTION

Conventional golf balls include a core or center region made of one or more compositions having a defined PGA compression value, and a cover made of one or more compositions having another PGA compression value. The combination of these compositions and structures results in a ball having an overall PGA compression.

As a general statement, a lower overall PGA compression value results in greater distance off the club, but reduced ball spin. The loss of spin causes a ball to release around the green, making it more difficult to stop the ball at a desired position.

Ball spin is influenced by, among other things, the cover material. In the past, balata materials were used as a cover material. While balata produced greater spin, it was also subject to cutting and shear if the ball was mis-hit. Moreover, balata is expensive. As a result, balata covered balls were generally preferred by lower handicap players willing to pay more for a golf ball.

More recently, synthetic thermoplastic resins have been developed as an alternative to balata. Most notably these synthetic thermoplastic materials are ionomeric resins. Ionomeric resins are polymers containing interchain ionic bonding. As is well known in the chemical arts, ionomeric resins are generally ionic copolymers of an olefin having from about two to about eight carbon atoms, such as ethylene and a metal salt of an unsaturated carboxylic acid, such as acrylic acid, methacrylic acid, or maleic acid. The pendent ionic groups in the ionomeric resins interact to form ion-rich aggregates contained in a non-polar polymer matrix. Metal ions, such as sodium, zinc or magnesium are used to neutralize some portion of the acidic groups in the copolymer. This results in a thermoplastic elastomer, which exhibits enhanced flight characteristics and durability when compared to golf balls constructed with balata covers. However, the advantages gained by enhanced durability have been offset by the decreased playability properties.

The most recognizable of these was developed by E. I. Dupont De Nemours & Company as commercially available under the name Surlyn®. There are several different grades of Surlyn® having varing acid content levels that effect the properties in different manners. Ionomeric resins from Exxon under the Trade name Iotek® are also available.

High acid content ionomers, which, for the purposes of this application, generally have an acid content of at greater than 15%, and general produce harder and tougher covers. These high acid resins usually have a flex modulus from greater than about 50,000 PSI. While high acid content ionomeric resins provide for better abrasion and cut resistance, their high flex modulus and hardness, 60 Shore D and higher, produce an uncomfortable hard feel to the golfer and reduces the amount of spin that can be imparted to the ball at impact. Examples of Surlyns®s in this category include grades 8140, 8150, 9120, 9910, 8945, and others.

To alleviate the hard feel associated with high acid ionomer resin covers, Dupont developed a series of low acid ionomeric resins that produce a softer feeling cover. These resins generally have an acid content less than 15%, and have flexural modulus from about 4,000 to 7,000 PSI. These ionomers or blends thereof provide for better feel and spin, and have very similar physical properties to those of balata. However, the low flex modulus and Shore D hardness, e.g. 40 or less, result in covers with poor cut, shear and abrasion resistance. Worse, wound balls with these covers tend to go "out-of-round" quicker than wound balls with balata covers. Examples of Surlyn® resins in this category include grades 6320, 8320, and 9320W, and others. The low modulus ionomers when used without high flexural modulus blends In an attempt to overcome the negative effects of high and low acid resins, DuPont suggested certain blends of high acid/low acid resins to produce balata-like properties in a golf ball covered with this material. The qualities found in these golf balls, especially as to durability, were not optimal, and while the blends reduced the effects associate with each, processing problems and cost increased, leaving it difficult to manufacture a low cost ball having physical characteristics similar to balata.

Others have suggested various combinations of high acid/low blends. U.S. Pat. No. 4,884,814 to Sullivan teaches blending a hard ionomer resin with a soft ionomer resin to produce a cover having enhanced playability characteristics and a good durability for continuous play. In that reference, a golf ball cover blend includes a hard Surlyn ionomer resin, having a hardness of 60–66 on the Shore D scale as measured in accordance with ASTM method D-2240, and various soft Surlyn ionomer resins having hardness ranging from 25–40 on the Shore D scale. Specifically, the patent claims 25–70% of the hard ionomer which is a sodium or zinc salt of the specified copolymer and having flexural modulus of 30,000–50,000 psi, blended with 75–25% of the soft ionomer which is a sodium or zinc salt of a specified terpolymer and having a flexural modulus of 3000–7000 psi.

U.S. Pat. No. 5,120,791, also to Sullivan, is designated an improvement to the earlier patent and reveals a composition said to have enhanced carrying distance. The blends of this second Sullivan patent include 90–10% of an acrylic acid based hard ionomer neutralized with sodium or zinc and having a Shore D hardness greater than 50 and a flexural modulus up to 70,000 psi, with an acrylic acid based soft ionomer having a Shore D hardness of 20–40 and a flexural modulus of 2000 to 8000 psi.

Covers produced according to these references have improved playability over traditional Surlyn covers but at a cost of losing resilience and distance properties.

More recently, the development of polyurethane covers allow for a low compression ball having a softer cover. Polyurethane cover golf balls provide a lower compression ball with a soft cover that is less susceptible to cutting while maintaining a relatively high spin rate. However, polyurethane balls are also expensive, making them less desirably for higher handicap or beginning golfers.

What is desirable is a relatively inexpensive golf ball having a low compression for distance and a high spin rate. The cover should be softer, but tougher to avoid cutting, shearing and/or abrasion from mis-hits by the beginning or high to mid handicap golfer.

OBJECT OF THE INVENTION

Accordingly, it is an object of the instant invention to provide a two-piece golf ball that has a soft feel in combination with superior distance and spin capabilities.

It is another object of the instant invention to optimize the combination of core compression, core size, core composition, cover composition, and cover hardness to provide a two-piece golf ball, which travels great distances, and at the same time complies with USGA regulations.

It is yet another object of the instant invention to provide a two-piece golf ball having a synthetic cover material that achieves the sound, feel, playability and flight performance qualities of balata or polyurethane covered golf balls.

It is a further object of the instant invention to lower the cost of manufacturing a two-piece golf ball that has a soft feel in combination with superior distance capabilities.

It is still a further object of the instant invention is to provide a two-piece golf ball having superior distance, trajectory and flight stability. The golf ball according to the present invention produces greater distance and higher spin at a cost significantly less than previous golf balls.

SUMMARY OF THE INVENTION

The invention achieves the above-described objectives by providing a two-piece golf ball having a solid rubber core, a cover, and a dimple pattern including between about 250 to 500 dimples. The ball preferably has a low PGA Compression and high spin rate. The cover is preferably made of a single ionomeric resin composition having a low acid, a relatively high flex modulus, and a relatively low Shore D hardness.

More preferably, the present invention is directed to a two-piece golf ball having a core compression in the range of 75 PGA to 95 PGA; a core diameter in the range of about 1.533 inches to about 1.547 inches. The cover composition comprises an ionomeric resin having a low acid content, a high flex modulus and a hardness less than about 55 Shore D. The cover has a thickness sufficient to produce a ball having a diameter of about 1.678" to about 1.690", a weight of between about 45.2 to about 46.0 g, a coefficient of restitution (COR) of at least 0.700 and a PGA Compression between about 75 to 105. This combination has been found to produce a ball with superior distance capabilities, which also satisfies USGA regulations. The use of these properties in the golf ball of the instant invention is based on the recognition that it is the combination of the core compression, core composition, core size, cover composition, and cover hardness that will produce a ball that will travel the greatest distance without compromising shot-making feel.

The cover material is preferably a relatively stiff ionomer resin. The preferred ionomer resin used in the cover composition should have a flex modulus of at least about 30,000 PSI and hardness of from 50 to about 55 as measured on the Shore D scale—ASTM 2240. This ionomer is preferably a terpolymer, comprising an ethylene, methacrylic acid and n or iso-butylacrylate, neutralized with sodium, zinc, magnesium or lithium cations. The terpolymer properties are further adjusted with the use of a metal stearate, preferably magnesium stearate to allow a higher flex modulus while maintaining a soft feel.

The combination of the aforementioned core, cover and dimple specifications produces a golf ball that possesses noticeable improvements in playability (i.e. softness in feel) without sacrificing the ball's durability (i.e. impact resistance etc.) which in turn relates directly to the distance a ball will travel when struck. In addition, the instant invention provides a golf ball composition that exhibits the desired properties of the three-piece wound ball (e.g. long distance in combination with a soft feel), but with the lower manufacture cost associated with the two-piece ball. These and other objects of the instant invention will be apparent from a reading of the following detailed description of the instant invention.

BRIEF DESCRIPTION OF THE DRAWINGS

The above and additional objects and advantages of this invention will be more clearly understood from the following detailed description thereof when read in conjunction with the accompanying drawings in which.

DESCRIPTION OF THE INVENTION

Figure 1:
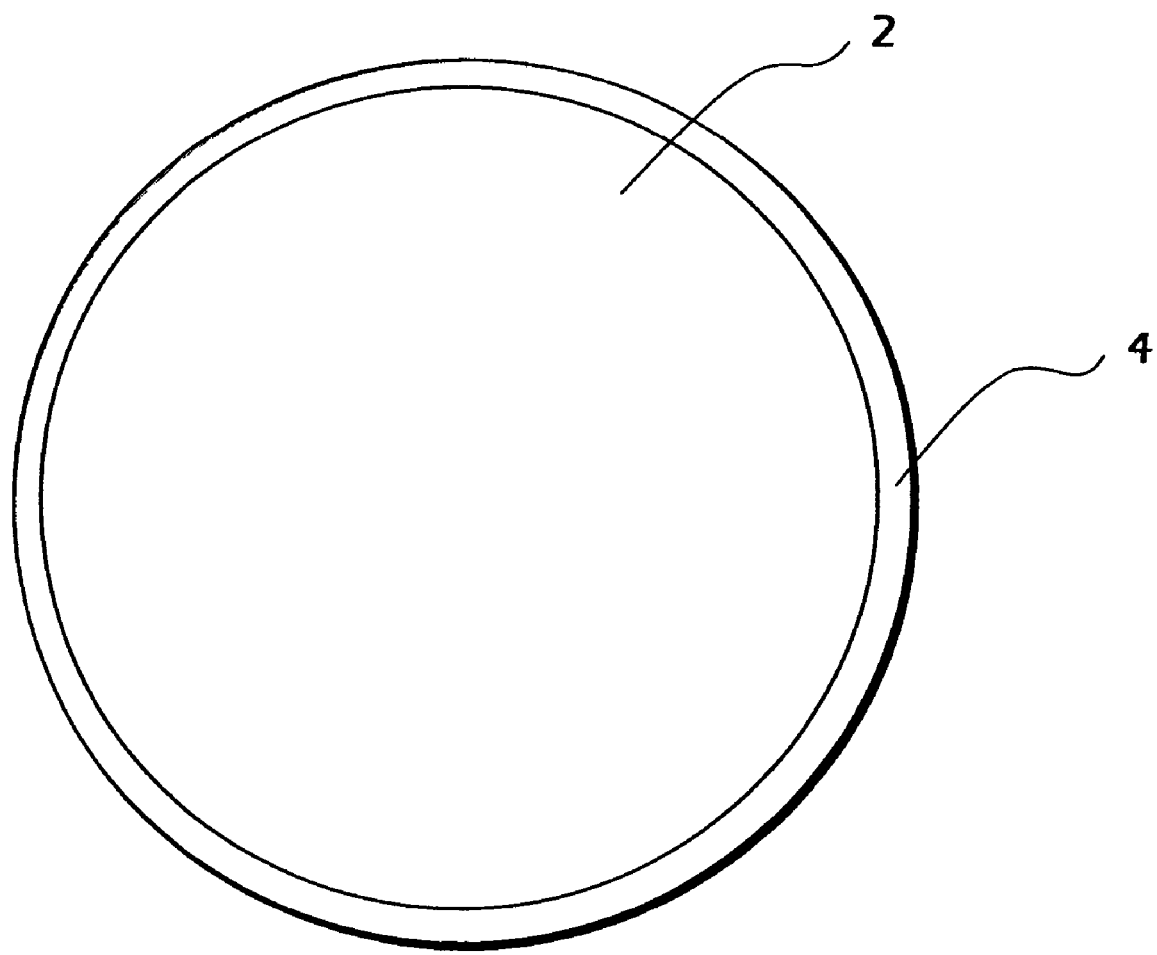
FIG. 1 is a cross-sectional view of a known two-piece golf ball.
Figure 2:
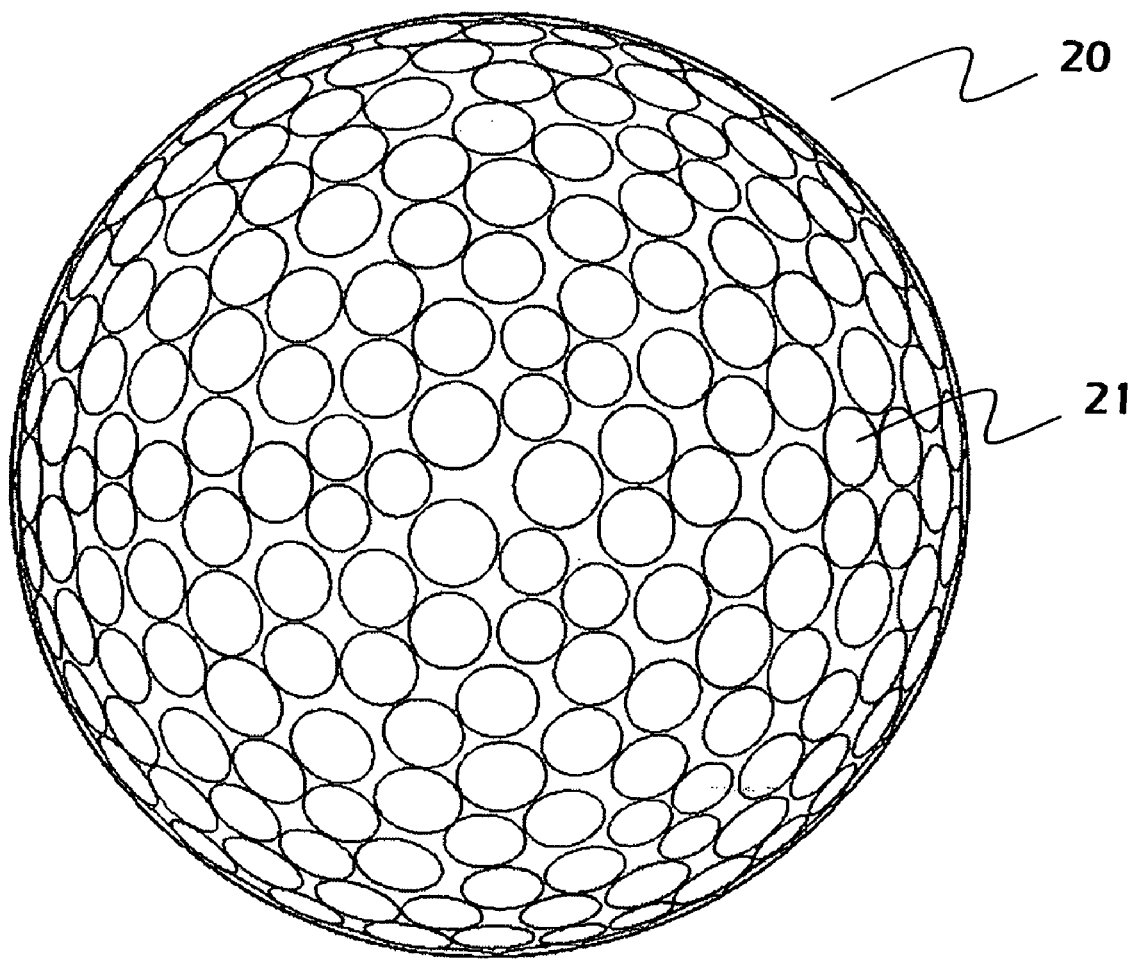
FIG. 2 is side view of a golf ball surface having 408 dimples.

FIG. 1 shows a section view of a two-piece golf ball made in accordance with the preferred embodiment of the instant invention. A two-piece golf ball has a solid rubber core 2 and a cover 4. The present invention contemplates as a preferred embodiment the use of 408 dimples as shown in FIG. 2 which illustrates a ball 20 having a plurality of dimples 21. In FIG. 2, the ball has dimples are arranged in a truncated octrahedron pattern, and has 408 dimples. This pattern is exemplary only and other patterns and numbers of dimples may be used without deviating from the invention, provided the dimple selection does not interfere with the desired high spin and distance flight performance characteristics.

Core

The solid rubber core 2 is manufactured using conventional compression molding processes. The components are mixed together and extruded to form preforms, which are then placed in cavities in the mold and are compression molded under pressure and cured or vulcanized to form cores. The same mix may also be injection molded. Curing is carried out in the mold at temperatures of between about 200–400° F. for five to twenty minutes depending on the compound. Once fully cured, the cores are removed from the mold cavities and prepared for application of a cover.

In the preferred embodiment, the golf ball core 2 is made of a solid rubber composition comprising a polybutadiene rubber center of a composition typical to the industry. For example, the composition may be 70–100 PHR polybutadiene rubber(s), 0.5–5 PHR zinc stearate, 25–35 PHR zinc diacrylate, 2.0–6.0 PHR zinc oxide, 5–20 PHR fillers, process aids and antioxidants, and 0.5–2.5 PHR peroxide initiator. In the preferred embodiment, the diameter of the solid rubber core 2 is about 1.540±0.007Δ. The core 2 weighs about 36.4±0.40 grams, and has a PGA compression of about 84±10. Table 1 shows 2 examples of cores in % weight.

TABLE 1

| Core Composition | Parts By % Weight | |
|---|---|---|
| | Ex. 1(T) | Ex. 2(G) |
| Polybutadiene(s) | | |
| Buena Cis 132 | 9.020 | 9.2872 |
| SKY 3S | 3.007 | 3.0987 |

TABLE 1-continued

| Core Composition | Parts By % Weight | |
|---|---|---|
| | Ex. 1(T) | Ex. 2(G) |
| Neodene 40/Dow Buna 50 | 48.104 | 49.5310 |
| Zinc Oxide | 3.007 | 3.0957 |
| Barium Sulfate | 9.057 | 7.8399 |
| Zinc Stearate | 1.804 | 1.8574 |
| Zinc Dyacrylate | 16.614 | 17.1039 |
| Titanium Dioxide | 0.601 | 0.6191 |
| Organic Peroxide[1] | 1.281 | 1.3156 |

[1]VAROX ® 231-XL Composition: 1,1-bis(tert-butylperoxy)3,3,5-trimethyl-cyclohexane on an inert filler As is well known in the art, the type and amount of crosslinking agents used to make the core will have the greatest influence on the core compression achieved. To prepare the core 2 according to the preferred embodiment, it has been found that a core composed primarily of high-cis polybutadiene in combination with cross-linking agents, activators, initiators and fillers (active and inactive), can be used to achieve a golf ball core having the desired compression characteristics. As used herein, high-cis means a cis isomer content of greater than 93%. It is to be understood that the core formula set forth herein is but one formula that can be used to make a core having the desired core compression.

Cover

Once formed, the solid rubber core 2 is then subjected to a conventional molding process whereby the ionomeric cover 4 is injection molded around the core 2 in a manner well known to those skilled in the art. To make the cover, the blended components of the cover are injection molded into cavities, which contain cores suspended in the center of the cavities. The inner surfaces of the cavities are constructed with dimple-shaped projections, which form the dimples in the cover. The number of dimples on the cover may vary from between about 250 to 500, with a preferred range from about 360 to 432, and most preferably, 408 such as illustrated in FIG. 2. The process used to make the cover is the standard process used and well known in the art wherein one or more components are added together to form a blend which is then injected into the mold. After molding, the golf balls produced may undergo further processing steps such as pressure blasting, vibratory finishing, stamping of the logo, application of a primer, and finally, application of a top coat.

In a preferred embodiment, the cover has a thickness of about 0.070" leading to provide a total diameter of core and cover of between about 1.678" to about 1.690", a weight of between about 45.2 to 46.0 g, a coefficient of restitution (COR) of at least 0.700, a hardness of about 55 Shore D and a PGA Compression of between about 75 to–105.

The preferred ionomer resin for the cover material should comprises an alpha olefin; an ethylenically unsaturated carboxylic acid; a metal cation in an amount sufficient to neutralize about 100% of the carboxylic acid; at least one softening monomer, selected from alkyl acrylate, and alkyl methacrylate; and a metal stearate. The ethylenically unsaturated carboxylic acid is an acrylic or methacrylic acid present in an amount of between about 2 to 10% by weight. The metal cation is selected from the group consisting of lithium, sodium, potassium, magnesium, calcium, barium, or zinc, or a combination of such cations, and is preferably a magnesium cation. The metal stearate is preferably magnesium stearate, but could be other metal staerates that would provide similar physical properties, such as calcium stearate for example.

A preferred cover material is comprised of HPF1000®, an ionomeric material available from E. I. Dupont De Nemours & Company. HPF1000® is a low acid content, believed to be no more than about 10%, highly neutralized, according to Dupont 100% neutralized, ethylene, acrylic acid, n-butyl acrylate terpolymer that contains magnesium stearate. HPF1000® is more highly neutralized than the typical Dupont Surlyns used to make golf ball covers as the following table illustrates:

TABLE 2

| PROPERTIES | HIGH ACID SURLYN | | | | LOW ACID SURLYN | | HPF |
|---|---|---|---|---|---|---|---|
| | 8140 | 8150 | 9150 | 9910 | 8320 | 9320W | 1000 |
| % Acid Content | 19% | 19% | 19% | 15% | 9% | 9% | 15% |
| Cation | Na | Na | Zn | Zn | Na | Zn | Mg |
| % Neutralization | 37% | 45% | 39% | 58% | 52% | 51% | 100% |
| Melt Index, g/10 min | 2.6 | 4.5 | 4.5 | .7 | 1.0 | .7 | .65 |
| Flex Modulus (kpsi) | 75 | 71 | 52 | 48 | 4.4 | 4.3 | 31 |
| Tensile Strength (kpsi) | 5.3 | 4.5 | 2.3 | 3.6 | .45 | 2.3 | 2.6 |
| % Elongation | 325 | 320 | 335 | 290 | 555 | 525 | 430 |
| Hardness, Shore D | 65 | 65 | 63 | 64 | 36 | 40 | 52 |

HPF1000® produces a cover having a relatively soft feel, approximately 52 Shore D, while having a flex modulus of about thereby providing excellent cut and abrasion resistance. Materials with these properties provide a cover that is highly resilient, providing superior spin characteristics when hit by a club.

EXAMPLES/FLIGHT CHARACTERISTICS

Several balls were made having core compositions according to Ex. 1(T) and Ex. 2(G). Each ball had cover made solely of the Dupont HPF1000® Material. The physical Specifications are provided below in Table 3. Outside of the core materials, each ball had approximately the same physical specifications at set forth below.

TABLE 3

| | Physical Properties |
|---|---|
| CORE | |
| Diameter | ≈1.540" |
| Weight | ≈36.4 g |
| PGA Compression | ≈84 |
| COVER | |
| Thickness | ≈0.070" |
| Flex Modulus | ≈31,000 psi |
| BALL | |
| Diameter | ≈1.540" |
| Weight | ≈36.4 g |
| Shore D Hardness | ≈55 |
| COR | ≈0.707 |
| PGA Compression | ≈90 |

Each ball was tested for spin rates using a 10° Driver, a 5 iron and a 9 iron. Spin rate was measured by observing the ball in flight using stop action strobe photography and the results are given below. The cover of each was made with a single ionomeric resin material, in this case HPF1000®, and each had the above described 408 dimple pattern. While the balls according to this example had 408 dimples, the number of dimples as noted above may range from 250 to 500.

Example 1

The balls Ex. 1(T) and Ex. 2(G) were struck using an Iron Byron type robotic machine using a 10° Driver at a 90 MPH Swing speed. Spin, carry and dispersion characteristics of each were recorded and are presented in Table 4. Those characteristics are compared against other balls generally considered to be high performance balls that are relatively expensive, and the results are summarized in Table 4.

TABLE 4

| Ball ID | Velocity | Launch Angle | Spin (RPM) | Carry | Dispersion Area |
|---|---|---|---|---|---|
| Ex. 1(T) | 192.23 | 12.75 | 3795 | 201.58 | 105.5 |
| Ex. 2(G) | 190.92 | 12.88 | 3527 | 201.83 | 99.5 |
| Titleist NXT Tour | 191.16 | 12.74 | 3682 | 200.66 | 166.0 |
| Callaway CB Red | 191.56 | 12.89 | 3505 | 203.76 | 125.5 |
| TF XL3000 Super Spin | 191.01 | 12.49 | 3859 | 199.74 | 155.4 |

Test Conditions:
Number of Hits: 12
Wind Speed (mph): 4.51 (Tail Wind)
Temperature (° F.): 46.33
Barometric Pressure: 29.21

The flight characteristics of the ball Ex. 1(T) and Ex. 2(G) are similar too and in fact exceed the flight characteristics and performance of other well known, more expensive balls.

Example 2

Balls constructed the same as Example 1 were struck using a 5 iron. Spin, carry and dispersion characteristics of each were recorded and are compared against other high performance balls and are summarized in Table 5.

TABLE 5

| Ball ID | Velocity | Launch Angle | Spin (RPM) | Carry | Dispersion Area |
|---|---|---|---|---|---|
| Ex. 1 (T) | 173.02 | 13.54 | 5296 | 160.94 | 191.6 |
| Ex. 2 (G) | 172.75 | 13.99 | 4638 | 164.80 | 72.3 |
| Titleist XNT Tour | 173.54 | 13.79 | 4888 | 162.43 | 176.7 |
| Callaway CB Red | 173.60 | 14.07 | 4523 | 161.10 | 144.8 |
| TF XL3000 Super Spin | 172.00 | 13.37 | 5223 | 156.25 | 203.3 |

Test Conditions:
Number of Hits: 11
Wind Speed (mph): 7.56
Temperature (° F.): 54.75
Barometric Pressure: 29.11

Again, the balls made according to the present invention again provide good spin, distance and dispersion characteristics, similar to other well known balls.

Example 3

Balls constructed the same as Example 1 were struck using a 9 iron. Spin, carry and dispersion characteristics of each were recorded and are compared against other high performance balls and are summarized in Table 6.

TABLE 6

| Ball ID | Velocity | Launch Angle | Spin (RPM) | Carry | Dispersion Area |
|---|---|---|---|---|---|
| Ex. 1 (T) | 154.98 | 25.32 | 7566 | 113.64 | 71.2 |
| Ex. 2 (G) | 155.00 | 25.32 | 7669 | 114.02 | 120.6 |
| Titleist NXT Tour | 155.82 | 23.60 | 8946 | 114.20 | 37.0 |
| Callaway CB Red | 154.79 | 24.98 | 7733 | 114.18 | 121.4 |
| TF XL3000 Super Spin | 153.49 | 23.76 | 8717 | 112.01 | 13.2 |

Test Conditions:
Number of Hits: 12
Wind Speed (mph): 4.30
Temperature (° F.): 48.23
Barometric Pressure: 29.08

Again, the balls according to the present invention perform as well as other well known golf balls.

The machine tests confirm that a ball made according to the present invention provides driving distances, spin rates and dispersion characteristics about the same as or better than the other, more expensive balls on the market. It will be appreciated that the instant specification and claims are set forth by way of illustration and not made without departing from the spirit and scope of the present invention.

We claim:

1. A golf ball comprising:
a core; and,
a cover layer comprising a single ionomer resin having an acid content that is at least 95% neutralized, a flex modulus of at least 30 kpsi and a Shore D hardness no greater than 55 and wherein the ionomer resin comprises:
a) an alpha olefin;
b) an ethylenically unsaturated carboxylic acid;
c) a metal cation in an amount sufficient to neutralize about 100% of the carboxylic acid;
d) at least one softening monomer, selected from alkyl acrylate, and alkyl methacrylate; and
e) a metal stearate.

2. A golf ball comprising:
a core; and,
a cover layer comprising a single ionomer resin having an acid content that is at least 95% neutralized, a flex modulus of at least 30 kpsi and a Shore D hardness no greater than 55 and wherein the ionomer resin comprises:
a) an alpha olefin;
b) an ethylenically unsaturated carboxylic acid wherein the ethylenically unsaturated carboxylic acid is an acrylic or methacrylic acid in an amount no more than about 10% by weight;
c) a metal cation in an amount sufficient to neutralize about 100% of the carboxylic acid;
d) at least one softening monomer, selected from alkyl acrylate, and alkyl methacrylate; and
e) a metal stearate.

3. A golf ball comprising:
a core; and,
a cover layer comprising a single ionomer resin having an acid content that is at least 95% neutralized, a flex modulus of at least 30 kpsi and a Shore D hardness no greater than 55 and wherein the ionomer resin comprises:
a) an alpha olefin;
b) an ethylenically unsaturated carboxylic acid;

c) a metal cation in an amount sufficient to neutralize about 100% of the carboxylic acid wherein the metal cation is selected from the group consisting of lithium, sodium, potassium, magnesium, calcium, barium, or zinc, or a combination of such cations;

d) at least one softening monomer, selected from alkyl acrylate, and alkyl methacrylate; and e) a metal stearate.

4. A golf ball comprising:

a core; and, a cover layer comprising a single ionomer resin having an acid content that is at least 95% neutralized, a flex modulus of at least 30 kpsi and a Shore D hardness no greater than 55 and wherein the ionomer resin comprises:

a) an alpha olefin;

b) an ethylenically unsaturated carboxylic acid;

c) a metal cation in an amount sufficient to neutralize about 100% of the carboxylic acid wherein the metal cation is a magnesium cation;

d) at least one softening monomer, selected from alkyl acrylate, and alkyl methacrylate; and e) a metal stearate.

5. A golf ball comprising:

a core having a PGA compression no greater than about 90; and, a cover comprising a blend of:

an ionomeric terpolymer comprising the reaction of an olefin, a acrylic acid, and an alkyl acrylate;

a metal ion donor sufficient to neutralize 100% of the acrylic acid present in the ionomeric terpolymer; and, a stearate.

6. A golf ball according to claim 5 wherein the ball, when struck with a standard 9-iorn, has a spin rate of at least 7500 rpm.

7. A golf ball according to claim 5 wherein the ball, when struck with a standard 5-iorn, a spin rate of at least 4600 rpm.

8. The golf ball according to claim 5 wherein the golf ball has a PGA compression of about 85, a coefficient of restitution greater than about 0.700, a Shore D hardness no greater than about 55, and a spin rate of at least 2700 RPM when struck with an 10° loft driver with a swing speed of about 90 mph.

9. A golf ball comprising:

a core having a PGA compression no greater than about 90, comprising at least one high cis content polybutadiene, zinc oxide, zinc stearate, zinc dyacrylate, an organic peroxide, and a filler material; and, a cover comprising a blend of:

an ionomeric terpolymer comprising the reaction of an olefin, a acrylic acid, and an alkyl acrylate;

a metal ion donor sufficient to neutralize 100% of the acrylic acid present in the ionomeric terpolymer; and, a metal stearate.

10. The golf ball according to claim 9 wherein the core and the cover materials are selected so that the golf ball has the following spin rate characteristics of a spin rate of at least 7500 rpm when struck with a standard 9-iron.

11. The golf ball according to claim 9 wherein the core and the cover materials are selected so that the golf ball has the following spin rate characteristics:

i) a spin rate of at least 7500 rpm when struck with a standard 9-iron; and, ii) a spin rate of at least 4600 rpm when struck with a standard 5 iron.

12. The golf ball according to claim 9 wherein the core and the cover materials are selected so that the golf ball has the following spin rate characteristics:

i) a spin rate of at least 7500 rpm when struck with a standard 9-iron ii) a spin rate of at least 4600 rpm when struck with a standard 5 iron; and iii) a spin rate of at least 2700 rpm when struck with a 10°loft driver with a swing speed of about 90 mph.

* * * * *